US012809159B2

(12) United States Patent
Wu et al.

(10) Patent No.: US 12,809,159 B2
(45) Date of Patent: Nov. 24, 2026

(54) OPTICAL MODULE

(71) Applicant: Actutek Corporation, Taoyuan City (TW)

(72) Inventors: Ya-Hsiu Wu, Taoyuan City (TW); Ying-Jen Wang, Taoyuan City (TW); Yi-Ho Chen, Taoyuan City (TW); Sin-Jhong Song, Taoyuan City (TW)

(73) Assignee: Actutek Corporation, Taoyuan City (TW)

( * ) Notice: Subject to any disclaimer, the term of this patent is extended or adjusted under 35 U.S.C. 154(b) by 379 days.

(21) Appl. No.: 18/593,103

(22) Filed: Mar. 1, 2024

(65) Prior Publication Data

US 2024/0295730 A1 Sep. 5, 2024

Related U.S. Application Data

(60) Provisional application No. 63/449,410, filed on Mar. 2, 2023.

(51) Int. Cl.

| | |
|---|---|
| ***G02B 26/08*** | (2006.01) |
| ***G02B 7/18*** | (2021.01) |
| ***G03B 5/00*** | (2021.01) |
| ***G03B 30/00*** | (2021.01) |

(52) U.S. Cl.

CPC ....... *G02B 26/0883* (2013.01); *G02B 7/1805* (2013.01); *G03B 5/00* (2013.01); *G03B 30/00* (2021.01); *G03B 2205/003* (2013.01)

(58) Field of Classification Search

CPC ............ G02B 26/0883; G02B 26/0875; G02B 26/085; G02B 7/02; G02B 7/1805; G02B 7/10; G02B 7/08; G02B 7/00; G02B 7/021; G02B 7/09; G02B 7/185; G02B 27/646; G03B 13/36; G03B 13/32; G03B 5/00; G03B 30/00; G03B 2205/003; H02K 11/0094; H02K 11/33; H02K 41/03; H02K 41/06; H04N 23/55; H04N 23/685

USPC ........................................................... 359/11

See application file for complete search history.

(56) References Cited

FOREIGN PATENT DOCUMENTS

WO WO-2006061623 A1 * 6/2006 ............. G02B 7/102

OTHER PUBLICATIONS

WO2006061623—retrieved from PE2E (Year: 2006).*

* cited by examiner

*Primary Examiner* — Travis S Fissel

(74) *Attorney, Agent, or Firm* — MUNCY, GEISSLER, OLDS & LOWE, P.C.

(57) ABSTRACT

An optical module is provided. The optical module includes an immovable part, a movable part, and a connecting unit. The movable part is movable relative to the immovable part within a movement range. The movable part is connected to an optical assembly. The movable part is movably connected to the immovable part via the connecting unit.

20 Claims, 9 Drawing Sheets

100

100

100

OPTICAL MODULE

CROSS REFERENCE TO RELATED APPLICATIONS

This application claims priority of U.S. Provisional Application No. 63/449,410, filed on Mar. 2, 2023, the entirety of which is incorporated by reference herein.

BACKGROUND OF THE INVENTION

Field of the Invention

The present disclosure relates to an optical module, and, in particular, to an optical module includes an immovable part and a movable part that may be driven to move and/or tilt relative to the immovable part.

Description of the Related Art

With technological development, many electronic devices (such as cell phones, tablets, laptops, etc.) are currently equipped with optical modules including at least one optical assembly, where the optical assembly may be driven to achieve different functions. For example, when the optical assembly is a lens, the user may take photos or record videos. However, current optical modules occupy a large volume in at least two dimensions among three dimensions, which is disadvantageous for miniaturization of electronic devices.

BRIEF SUMMARY OF THE INVENTION

Some embodiments of the present disclosure provide an optical module. The optical module includes an immovable part, a movable part, and a connecting unit. The movable part is movable relative to the immovable part within a movement range. The movable part is connected to an optical assembly. The movable part is movably connected to the immovable part via the connecting unit.

In some embodiments, the connecting unit includes a first connecting assembly and a second connecting assembly movably connected to the first connecting assembly. An arrangement direction along which the center of the first connecting assembly and the center of the second connecting element are arranged is parallel with a main axis. When viewed along the main axis, at least one of the first connecting assembly and the second connecting assembly at least partially overlaps the optical assembly. In some embodiments, the first connecting assembly includes a first connecting element, a second connecting element, and a third connecting element. The first connecting element includes a first intermediate connecting portion movably connected to the second connecting assembly, a first immovable-part connecting-portion connected to the immovable part, a first bent portion having a bent structure and located between the first intermediate connecting portion and the first immovable-part connecting-portion, and a first flat portion having a flat structure and connected to the first bent portion. The second connecting element includes a second intermediate connecting portion movably connected to the second connecting assembly, a second immovable-part connecting-portion connected to the immovable part, a second bent portion having a bent structure and located between the second intermediate connecting portion and the second immovable-part connecting-portion, and a second flat portion having a flat structure and connected to the second bent portion. The third connecting element includes a third intermediate connecting portion movably connected to the second connecting assembly, a third immovable-part connecting-portion connected to the immovable part, a third bent portion having a bent structure and located between the third intermediate connecting portion and the third immovable-part connecting-portion, and a third flat portion having a flat structure and connected to the third bent portion.

In some embodiments, the first immovable-part connecting-portion is located between the first bent portion and the first flat portion, the second immovable-part connecting-portion is located between the second bent portion and the second flat portion, the third immovable-part connecting-portion is located between the third bent portion and the third flat portion, the first flat portion is rotatable relative to the immovable part around a first axis, the second flat portion is rotatable relative to the immovable part around a second axis, and the third flat portion is rotatable relative to the immovable part around a third axis.

In some embodiments, the second connecting assembly includes a fourth connecting element, a fifth connecting element, and a sixth connecting element. The fourth connecting element includes a fourth intermediate connecting portion movably connected to the first connecting assembly, a fourth movable-part connecting-portion connected to the movable part, and a fourth bent portion having a bent structure and located between the fourth intermediate connecting portion and the fourth movable-part connecting-portion. The fifth connecting element includes a fifth intermediate connecting portion movably connected to the first connecting assembly, a fifth movable-part connecting-portion connected to the movable part, and a fifth bent portion having a bent structure and located between the fifth intermediate connecting portion and the fifth movable-part connecting-portion. The sixth connecting element includes a sixth intermediate connecting portion movably connected to the first connecting assembly, a sixth movable-part connecting-portion connected to the movable part, and a sixth bent portion having a bent structure and located between the sixth intermediate connecting portion and the sixth movable-part connecting-portion.

In some embodiments, the plane where the first intermediate connecting portion, the second intermediate connecting portion, and the third intermediate connecting portion are located is an intermediate imaginary plane, the plane where the fourth movable-part connecting-portion, the fifth movable-part connecting-portion, and the sixth movable-part connecting-portion are located is a movable part imaginary plane. When the movable part is in an initial position, the intermediate imaginary plane is perpendicular to the main axis, and the movable part imaginary plane is also perpendicular to the main axis. When the movable part is in a tilted position, the movable part imaginary plane is perpendicular to a tilt axis that is not parallel with the main axis. When the movable part is in any position within the movement range, the intermediate imaginary plane is perpendicular to the main axis.

In some embodiments, the optical module further includes a driving unit. The driving unit includes a first driving assembly, a second driving assembly, and a third driving assembly. The first driving assembly generates a first driving force applied to the first flat portion. The first driving assembly includes a first coil and a first magnetic element corresponding to the first coil. The second driving assembly generates a second driving force applied to the second flat portion. The second driving assembly includes a second coil and a second magnetic element corresponding to the second coil. The third driving assembly generates a third driving force applied to the third flat portion. The third driving assembly includes a third coil and a third magnetic element corresponding to the third coil. At least two of the center of the first driving assembly, the center of the second driving assembly, and the center of the third driving assembly are located at different heights. The direction of the first driving force, the direction of the second driving force, and the direction of the third driving force are not parallel with each other. The direction of the first driving force, the direction of the second driving force, and the direction of the third driving force are not parallel with the main axis.

In some embodiments, the direction of the first driving force, the direction of the second driving force, and the direction of the third driving force are perpendicular to the main axis. The first magnetic element includes a first surface and a second surface. The first surface and the second surface are both parallel with the main axis. The first surface and the second surface are neither parallel with nor perpendicular to each other. At least two of the maximum size of the first coil measured along the main axis, the maximum size of the second coil measured along the main axis, and the maximum size of the third coil measured along the main axis are different.

In some embodiments, the optical module further includes a driving unit, a first connecting assembly, and a sensing assembly. The driving unit drives the first connecting assembly to rotate. The first connecting assembly is connected to the immovable part. The first connecting assembly includes a first connecting element, a second connecting element, and a third connecting element. The sensing assembly includes a first sensing element sensing the movement of the first connecting element and outputting a first sensing signal regarding the first connecting element, a second sensing element sensing the movement of the second connecting element and outputting a second sensing signal regarding the second connecting element, and a third sensing element sensing the movement of the third connecting element and outputting a third sensing signal regarding the third connecting element.

In some embodiments, the optical module further includes a database. The database records the movement of the movable part relative to the immovable part. The database includes reference information recording the first sensing signal, the second sensing signal, and the third sensing signal under the circumstance that the movable part is in an initial position, first limit information recording the first sensing signal, the second sensing signal, and the third sensing signal under the circumstance that the movable part is in a first limit position relative to the immovable part, second limit information recording the first sensing signal, the second sensing signal, and the third sensing signal under the circumstance that the movable part is in a second limit position relative to the immovable part, and third limit information recording the first sensing signal, the second sensing signal, and the third sensing signal under the circumstance that the movable part is in a third limit position relative to the immovable part. A calibration procedure is performed by the driving unit based on the database to make sure that the movable part moves normally, the calibration procedure includes making the movable part move to the initial position, the first limit position, the second limit position, and the third limit position and confirming whether the sensed first sensing signal, the sensed second sensing signal, and the sensed third sensing signal are consistent with those stored in the database.

In some embodiments, the immovable part includes a base, a bottom plate, and a fixing rod. The bottom plate is disposed on the base. The bottom plate includes a central rod. The fixing rod surrounds the central rod. In some embodiments, the fixing rod has a plurality of recessed portions. In some embodiments, the central rod and the fixing rod extend along the same direction. In some embodiments, the movable part includes a movable part body and a plurality of movable part bent portions bent downwardly relative to the movable part body. In some embodiments, the plurality of movable part bent portions are spaced apart from each other by the same angle. In some embodiments, the angle between adjacent two of the plurality of movable part bent portions is approximately 120 degrees. In some embodiments, the optical module further includes a driving unit including a first coil, a second coil, and a third coil. The first coil, the second coil, and the third coil are located over the immovable part. The first coil, the second coil, and the third coil all have different thicknesses. In some embodiments, the first coil, the second coil, and the third coil are sector-like. In some embodiments, the driving unit further includes a first magnetic element located above the first coil, a second magnetic element located above the second coil, and a third magnetic element located above the third coil. In some embodiments, the connecting unit includes a first connecting element located above the first magnetic element, a second connecting element located above the second magnetic element, and a third connecting element is located above the third magnetic element.

BRIEF DESCRIPTION OF THE DRAWINGS

The present disclosure may be more fully understood by reading the detailed description and examples with references made to the accompanying drawings. It should be noted that various features may be not drawn to scale. In fact, the dimensions of the various features may be arbitrarily increased or decreased for clarity of discussion, and the various features may be drawn schematically.

DETAILED DESCRIPTION OF THE INVENTION

The following description provides different embodiments, or examples, for implementing different features of the present disclosure. For example, the formation of a first feature "on" or "over" a second feature in the following description may include embodiments in which the first and second features are formed in direct contact, and may also include embodiments in which additional features may be formed between the first feature and the second feature, such that the first feature and the second feature are not in direct contact.

In addition, spatially relative terms such as "on" and "under" may be used to describe the relationship between an element (or a feature) and another element (or another feature). The spatially relative terms are intended to encompass different orientations of the devices in use or operation in addition to the orientation depicted in figures. The devices may be otherwise oriented (rotated 90 degrees or at other orientations), and the spatially relative terms used herein may likewise be interpreted accordingly. For example, if a device of the drawings is flipped upside down, an element that is “above” will become an element that is “below”. Furthermore, ordinal terms such as “first”, “second”, etc., used in the description and claims do not by themselves connote any priority, precedence, or order of one element over another, but are used merely as labels to distinguish one element from another element having the same name.

In the following description, the terms “including”, “comprising”, “having”, and the like should be interpreted as meaning “including but not limited to . . . ”. Therefore, when the terms “including”, “comprising”, “having”, and the like are used, the presence of corresponding features, regions, steps, operations and/or elements is specified, and without excluding the presence of other features, regions, steps, operations and/or elements.

Figure 1:
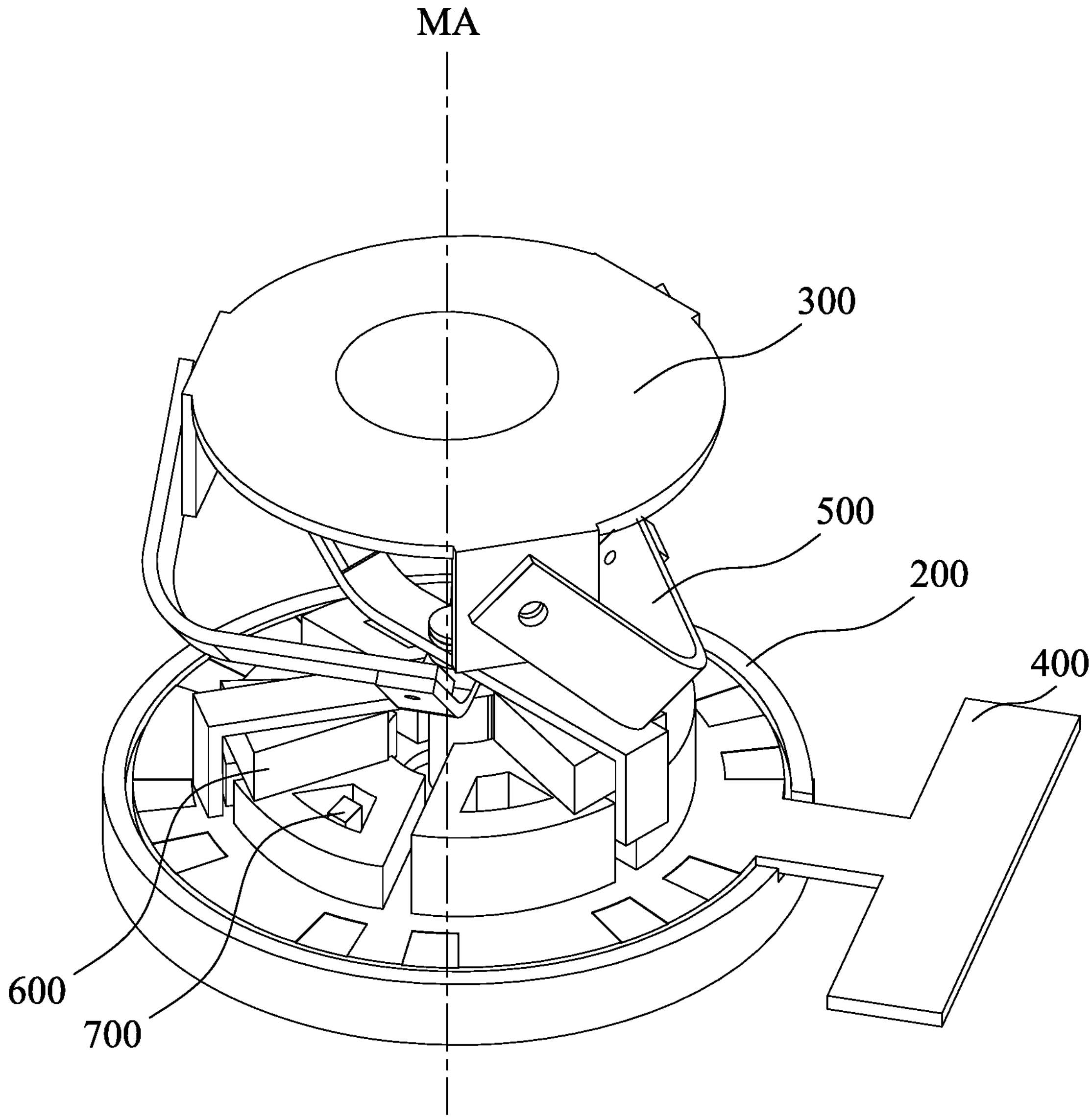
FIG. 1 and FIG. 2 are perspective views of the optical module, in accordance with some embodiments.
Figure 2:
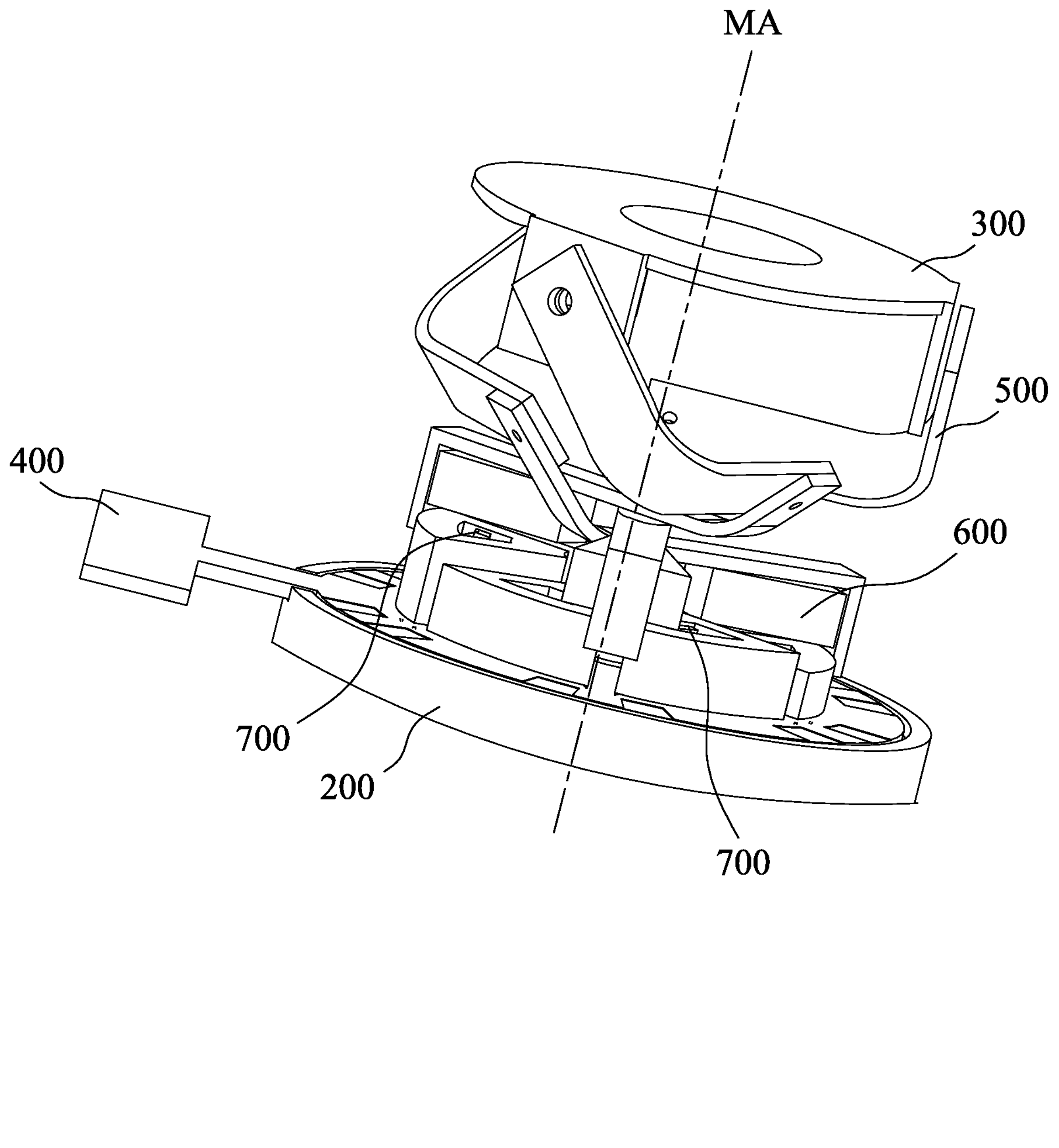
Figure 3:
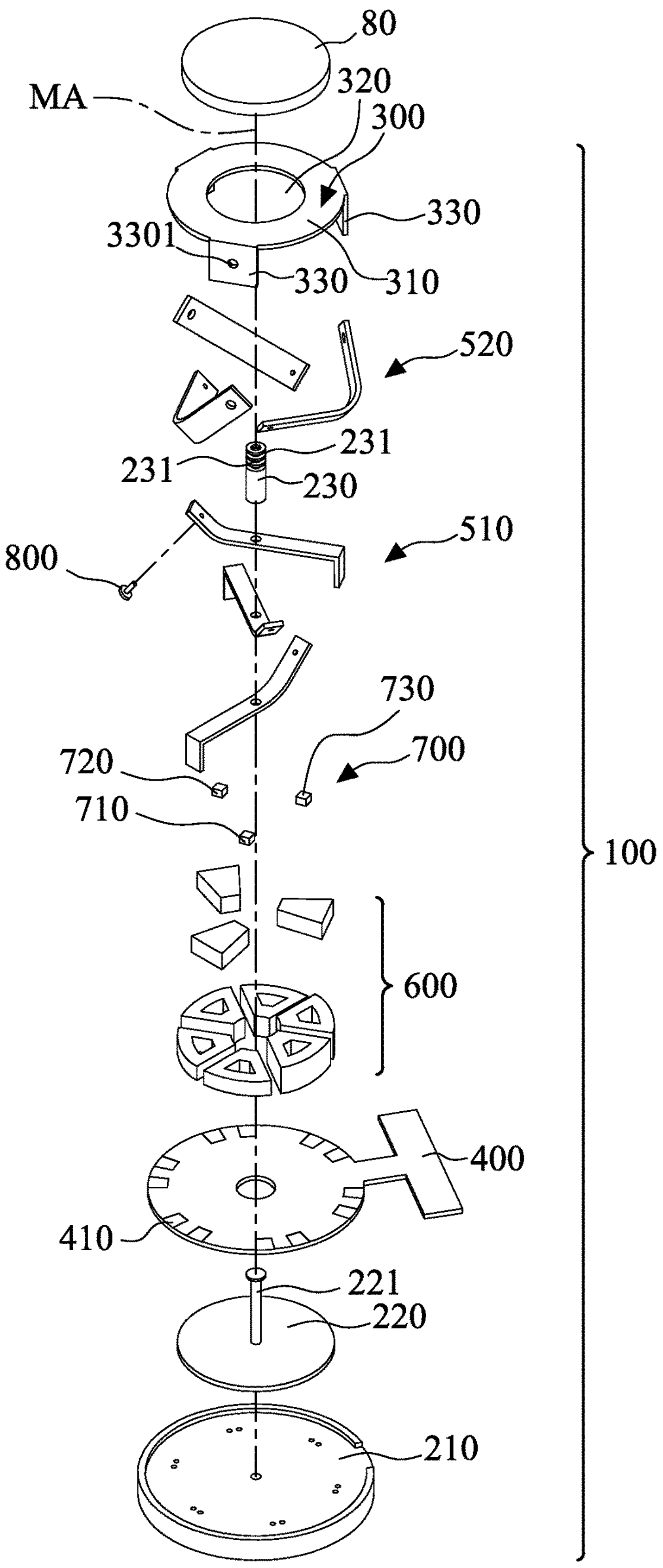
FIG. 3 is an exploded view of the optical module, in accordance with some embodiments.

Some embodiments of the present disclosure provide an optical module 100. Please refer to FIG. 1 to FIG. 3. FIG. 1 and FIG. 2 are perspective views of the optical module 100, in accordance with some embodiments. FIG. 3 is an exploded view of the optical module 100, in accordance with some embodiments. In some embodiments, the optical module 100 includes an immovable part 200, a movable part 300, a circuit unit 400, a connecting unit 500, a driving unit 600, and a sensing assembly 700, but the elements included in the optical module 100 are not limited thereto. For ease of illustration, the central axis of the entire optical module 100 is defined as a main axis MA.

The immovable part 200 may include a base 210, a bottom plate 220, and a fixing rod 230. The base 210 may include different shapes. In some embodiments, the base 210 may be a cuboid or a cylinder, but the shape of the base 210 is not limited thereto. The bottom plate 220 is disposed on the base 210. The bottom plate 220 may include a central rod 221. The fixing rod 230 may surround the central rod 221. The fixing rod 230 may include a plurality of recessed portions 231. The central rod 221 and the fixed rod 230 may be cylinders extending along the main axis MA.

The movable part 300 may be connected to an optical assembly 80. Specifically, the optical assembly 80 may be disposed on the top surface of the movable part 300. In some embodiments, the optical assembly 80 may include a lens, a mirror, a prism, a beam splitter, an aperture, a liquid lens, an image sensor, a camera module, a ranging module, a scanning element, etc., but the optical assembly 80 is not limited thereto. In some embodiments, the optical assembly 80 may be a voice coil motor, which includes an optical element and may have auto focus (AF) and/or optical image stabilization (OIS) function. The optical module 100 including the optical assembly 80 may be installed on an electronic device, such as a cell phone, a tablet computer, or a notebook, but the electronic device is not limited thereto.

The movable part 300 is disposed over the connecting unit 500. The movable part 300 is movably connected to the immovable part 200 via the connecting unit 500. That is, the movable part 300 is movable relative to the immovable part 200. In some embodiments, the movable part 300 includes a movable part body 310, a movable part opening 320, and three movable part bent portions 330. The movable part opening 320 is formed inside the movable part body 310. In some embodiments, the size of the movable part opening 320 is designed to be slightly smaller than the size of the optical assembly 80 to be connected. Through the movable part opening 320, the overall weight of the optical module 100 may be reduced, which is advantageous for miniaturization of the optical module 100.

The three movable part bent portions 330 are bent downward and toward the immovable part 200 relative to the movable part body 310. In some embodiments, the three movable part bent portions 330 are spaced apart from each other by the same angle. That is, an angle between adjacent two of the three movable part bent portions 330 may be approximately 120 degrees (360 degrees divided by three). In some embodiments, each movable part bent portion 330 includes a hole 3301. The number of movable part bent portions 330 may be determined and changed according to the degree of freedom of the movable part 300.

The circuit unit 400 is disposed on the immovable part 200. The circuit unit 400 may be a flexible printed circuit (FPC) or a flex-rigid board. The circuit unit 400 may include a plurality of pins 410. In this embodiment, the pins 410 are paired, one of which may allow current to flow in, and the other one may allow current to flow out.

Figure 4:
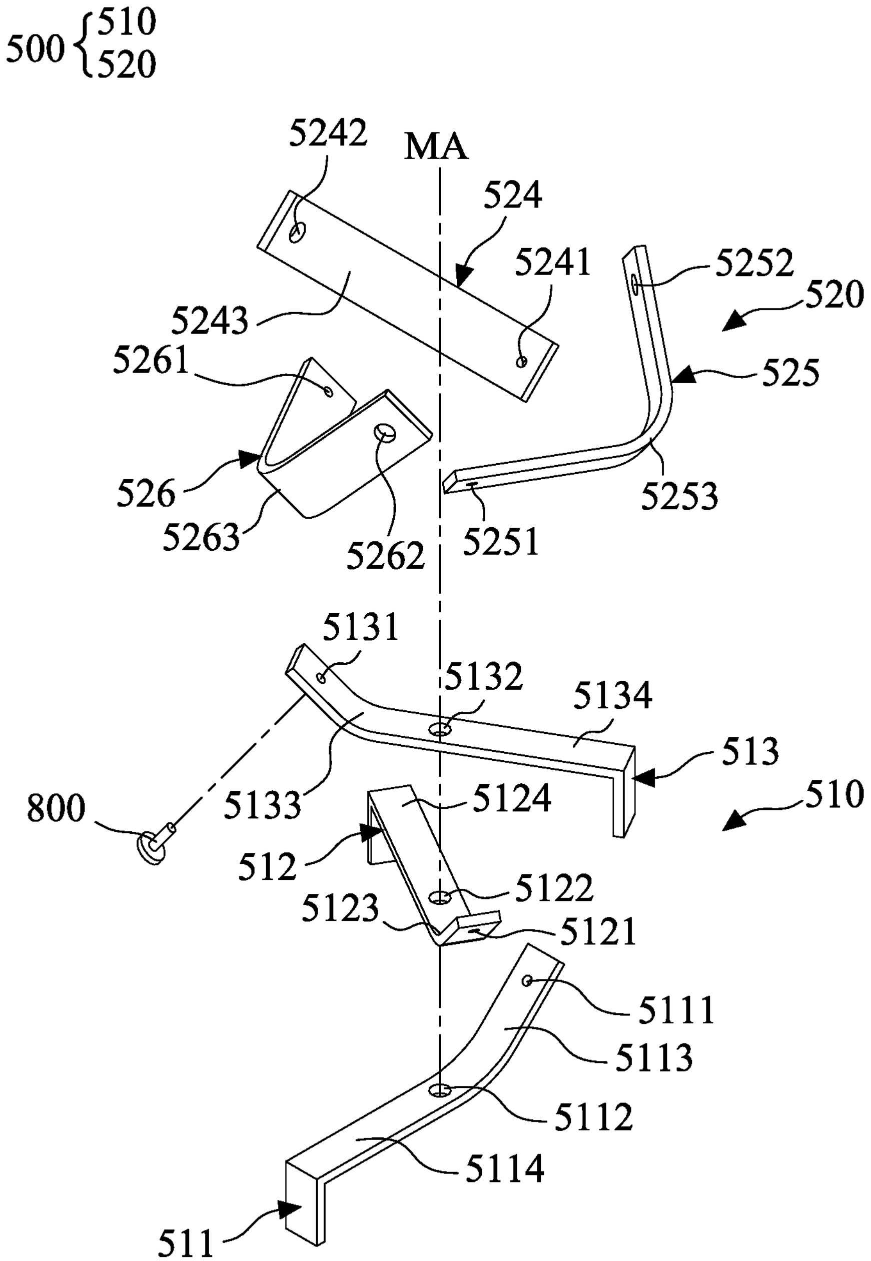
FIG. 4 is an exploded view of the connecting unit, in accordance with some embodiments.

Next, in addition to FIG. 1 to FIG. 3, please refer to FIG. 4 to understand the connecting unit 500. FIG. 4 is an exploded view of the connecting unit 500, in accordance with some embodiments. The movable part 300 may be movably connected to the immovable part 200 via the connecting unit 500. The connecting unit 500 includes a first connecting assembly 510 and a second connecting assembly 520. The second connecting assembly 520 is movably connected to the first connecting assembly 510. That is, the second connecting assembly 520 is movable relative to the first connecting assembly 510. The arrangement direction along which the center of the first connecting assembly 510 and the center of the second connecting assembly 520 are arranged is parallel with the main axis MA. When viewed along the main axis MA, at least one of the first connecting assembly 510 and the second connecting assembly 520 at least partially overlaps the optical assembly 80.

Since the first connecting assembly 510 and the second connecting assembly 520 are arranged along the main axis MA, the overall size of the optical module 100 in the directions perpendicular to the main axis MA may be reduced, and the volume in at least two dimensions among three dimensions may be reduced. Therefore, miniaturization of the optical module 100 may be achieved. In addition, the first connecting assembly 510 and the second connecting assembly 520 may be made of materials that are less likely to generate particles or debris, so as to avoid the contact between the first connecting assembly 510 and the second connecting assembly 520 from generating particles or debris. In some embodiments, the first connecting assembly 510 and the second connecting assembly 520 are made of metal, but the materials of the first connecting assembly 510 and the second connecting assembly 520 are not limited thereto.

The first connecting assembly 510 is located between the second connecting assembly 520 and the immovable part 200. In some embodiments, the first connecting assembly 510 includes a first connecting element 511, a second connecting element 512, and a third connecting element 513. The first connecting element 511, the second connecting element 512, and the third connecting element 513 may have substantially the same shape, material, structure, etc.

The first connecting element 511 includes a first intermediate connecting portion 5111, a first immovable-part connecting-portion 5112, a first bent portion 5113, and a first flat portion 5114. The first intermediate connecting portion 5111 is movably connected to the second connecting assembly 520. That is, the first intermediate connecting portion 5111 is movable relative to the second connecting assembly 520. In some embodiments, the first intermediate connecting portion 5111 is a hole. The first immovable-part connecting-portion 5112 is connected to the immovable part 200. In some embodiments, the first immovable-part connecting-portion 5112 is a hole, and the fixing rod 230 of the immovable part 200 passes through the first immovable-part connecting-portion 5112. The first immovable-part connecting-portion 5112 is located between the first bent portion 5113 and the first flat portion 5114. The first bent portion 5113 has a bent structure, and the first bent portion 5113 is located between the first intermediate connecting portion 5111 and the first immovable-part connecting-portion 5112. The first flat portion 5114 has a flat structure, and the first flat portion 5114 is connected to the first bent portion 5113.

The second connecting element 512 includes a second intermediate connecting portion 5121, a second immovable-part connecting-portion 5122, a second bent portion 5123, and a second flat portion 5124. The second intermediate connecting portion 5121 is movably connected to the second connecting assembly 520. That is, the second intermediate connecting portion 5121 is movable relative to the second connecting assembly 520. In some embodiments, the second intermediate connecting portion 5121 is a hole. The second immovable-part connecting-portion 5122 is connected to the immovable part 200. In some embodiments, the second immovable-part connecting-portion 5122 is a hole, and the fixing rod 230 of the immovable part 200 passes through the second immovable-part connecting-portion 5122. The second immovable-part connecting-portion 5122 is located between the second bent portion 5123 and the second flat portion 5124. The second bent portion 5123 has a bent structure, and the second bent portion 5123 is located between the second intermediate connecting portion 5121 and the second immovable-part connecting-portion 5122. The second flat portion 5124 has a flat structure, and the second flat portion 5124 is connected to the second bent portion 5123.

The third connecting element 513 includes a third intermediate connecting portion 5131, a third immovable-part connecting-portion 5132, a third bent portion 5133, and a third flat portion 5134. The third intermediate connecting portion 5131 is movably connected to the second connecting assembly 520. That is, the third intermediate connecting portion 5131 is movable relative to the second connecting assembly 520. In some embodiments, the third intermediate connecting portion 5131 is a hole. The third immovable-part connecting-portion 5132 is connected to the immovable part 200. In some embodiments, the third immovable-part connecting-portion 5132 is a hole, and the fixing rod 230 of the immovable part 200 passes through the third immovable-part connecting-portion 5132. The third immovable-part connecting-portion 5132 is located between the third bent portion 5133 and the third flat portion 5134. The third bent portion 5133 has a bent structure, and the third bent portion 5133 is located between the third intermediate connecting portion 5131 and the third immovable-part connecting-portion 5132. The third flat portion 5134 has a flat structure, and the third flat portion 5134 is connected to the third bent portion 5133.

In addition, the first immovable-part connecting-portion 5112 is located below the second immovable-part connecting-portion 5122. The second immovable-part connecting-portion 5122 is located between the first immovable-part connecting-portion 5112 and the third immovable-part connecting-portion 5132. The third immovable-part connecting-portion 5132 is located on the second immovable-part connecting-portion 5122. In some embodiments, the first immovable-part connecting-portion 5112, the second immovable-part connecting-portion 5122, and the third immovable-part connecting-portion 5132 may engage with different recessed portions 231 of the fixing rod 230 to strengthen the connection between each other.

The second connecting assembly 520 is located between the movable part 300 and the first connecting assembly 510. In some embodiments, the second connecting assembly 520 includes a fourth connecting element 524, a fifth connecting element 525, and a sixth connecting element 526. The fourth connecting element 524, the fifth connecting element 525, and the sixth connecting element 526 may have substantially the same shape, material, structure, etc.

The fourth connecting element 524 includes a fourth intermediate connecting portion 5241, a fourth movable-part connecting-portion 5242, and a fourth bent portion 5243. The fourth intermediate connecting portion 5241 is movably connected to the first connecting assembly 510. That is, the fourth intermediate connecting portion 5241 is movable relative to the first connecting assembly 510. In some embodiments, the fourth intermediate connecting portion 5241 is a hole, a fastening element 800 passes through the fourth intermediate connecting portion 5241 and the first intermediate connecting portion 5111, so that the fourth connecting element 524 and the first connecting element 511 are connected to each other. The fastening element 800 may be a screw, a bolt, etc. For ease of illustration, only one fastening element 800 is illustrated in FIG. 3 and FIG. 4, but more fastening elements 800 may also be present.

The fourth movable-part connecting-portion 5242 is connected to the movable part 300. In some embodiments, the fourth movable-part connecting-portion 5242 is a hole, and the fastening element 800 passes through the fourth movable-part connecting-portion 5242 and the corresponding hole 3301 of the movable part bent portions 330, so that the fourth movable-part connecting-portion 5242 is connected to the movable part 300. The fourth bent portion 5243 has a bent structure, and the fourth bent portion 5243 is located between the fourth intermediate connecting portion 5241 and the fourth movable-part connecting-portion 5242.

The fifth connecting element 525 includes a fifth intermediate connecting portion 5251, a fifth movable-part connecting-portion 5252, and a fifth bent portion 5253. The fifth intermediate connecting portion 5251 is movably connected to the first connecting assembly 510. That is, the fifth intermediate connecting portion 5251 is movable relative to the first connecting assembly 510. In some embodiments, the fifth intermediate connecting portion 5251 is a hole, the fastening element 800 passes through the fifth intermediate connecting portion 5251 and the second intermediate connecting portion 5121, so that the fifth connecting element 525 and the second connecting element 512 are connected to each other.

The fifth movable-part connecting-portion 5252 is connected to the movable part 300. In some embodiments, the fifth movable-part connecting-portion 5252 is a hole, the fastening element 800 passes through the fifth movable-part connecting-portion 5252 and the corresponding hole 3301 of the movable part bent portions 330, so that the fifth movable-part connecting-portion 5252 is connected to the movable part 300. The fifth bent portion 5253 has a bent structure, and the fifth bent portion 5253 is located between the fifth intermediate connecting portion 5251 and the fifth movable-part connecting-portion 5252.

The sixth connecting element 526 includes a sixth intermediate connecting portion 5261, a sixth movable-part connecting-portion 5262, and a sixth bent portion 5263. The sixth intermediate connecting portion 5261 is movably connected to the first connecting assembly 510. That is, the sixth intermediate connecting portion 5261 is movable relative to the first connecting assembly 510. In some embodiments, the sixth intermediate connecting portion 5261 is a hole, the fastening element 800 passes through the sixth intermediate connecting portion 5261 and the second intermediate connecting portion 5121, so that the sixth connecting element 526 and the second connecting element 512 are connected to each other.

The sixth movable-part connecting-portion 5262 is connected to the movable part 300. In some embodiments, the sixth movable-part connecting-portion 5262 is a hole, the fastening element 800 passes through the sixth movable-part connecting-portion 5262 and the corresponding hole 3301 of the movable part bent portions 330, so that the sixth movable-part connecting-portion 5262 is connected to the movable part 300. The sixth bent portion 5263 has a bent structure, and the sixth bent portion 5263 is located between the sixth intermediate connecting portion 5261 and the sixth movable-part connecting-portion 5262.

Figure 5A:
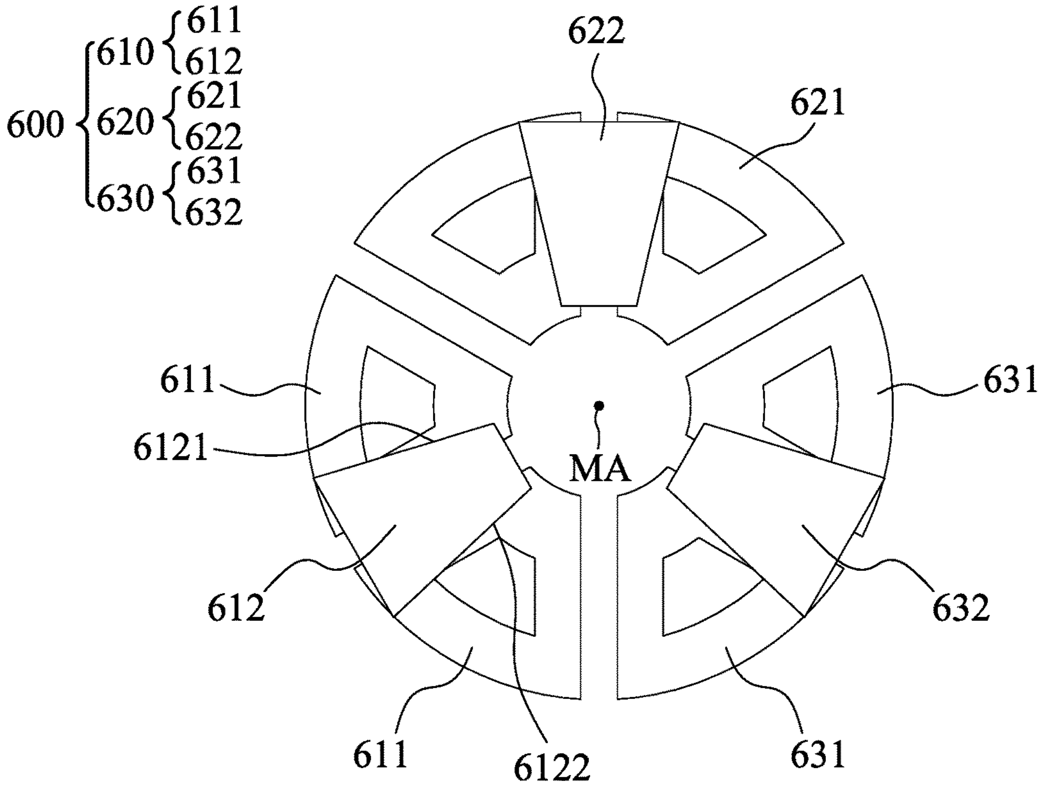
FIG. 5A and FIG. 5B are top view and side view of the driving unit, in accordance with some embodiments.
Figure 5B:
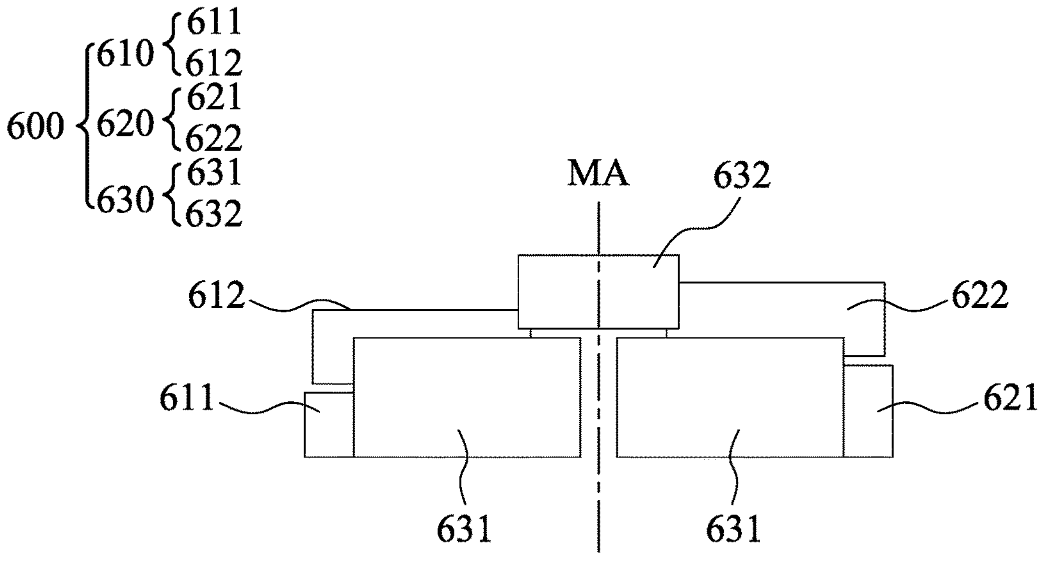
Figure 6A:
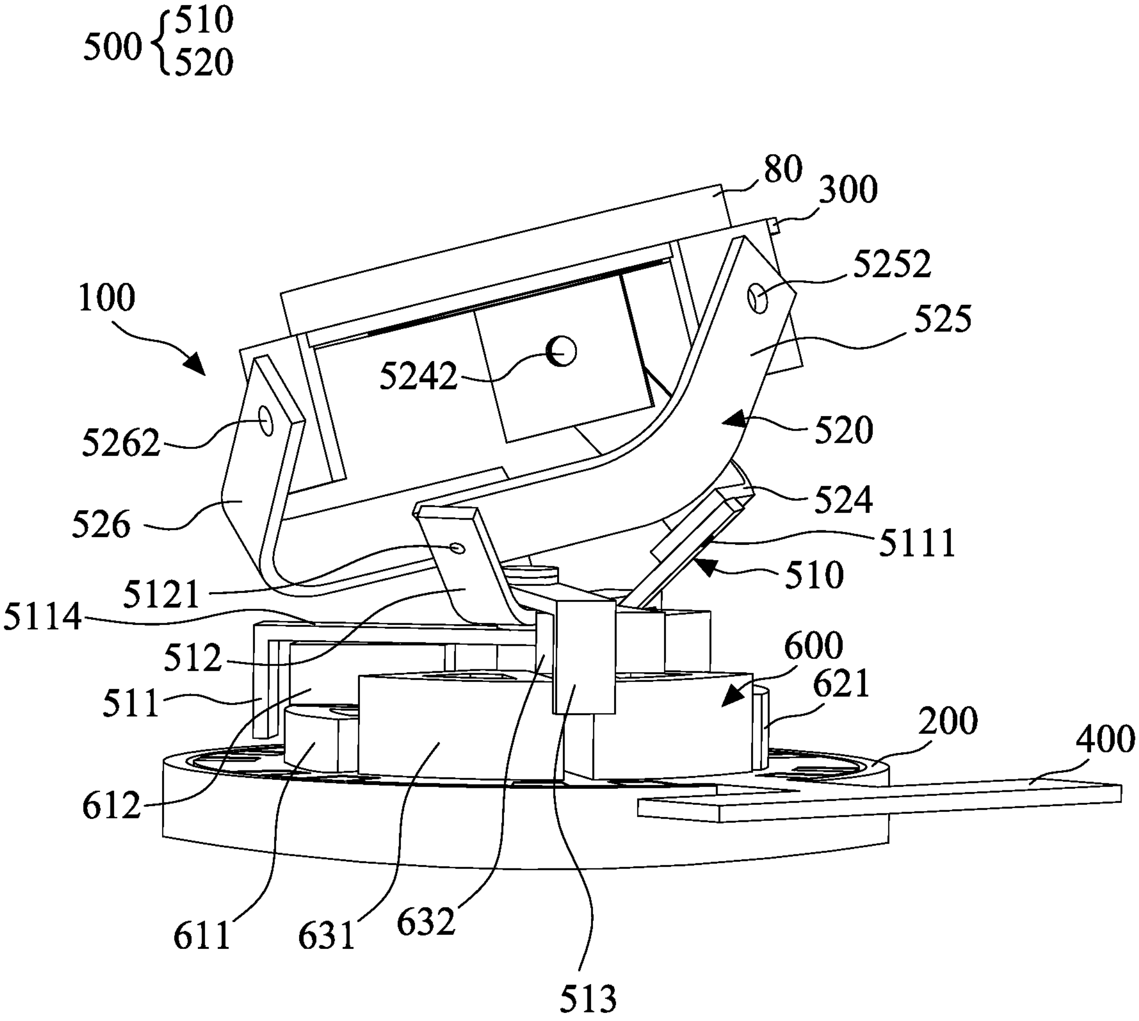
FIG. 6A to FIG. 6D are schematic views showing the movable part in a tilted position from different perspectives, in accordance with some embodiments.
Figure 6B:
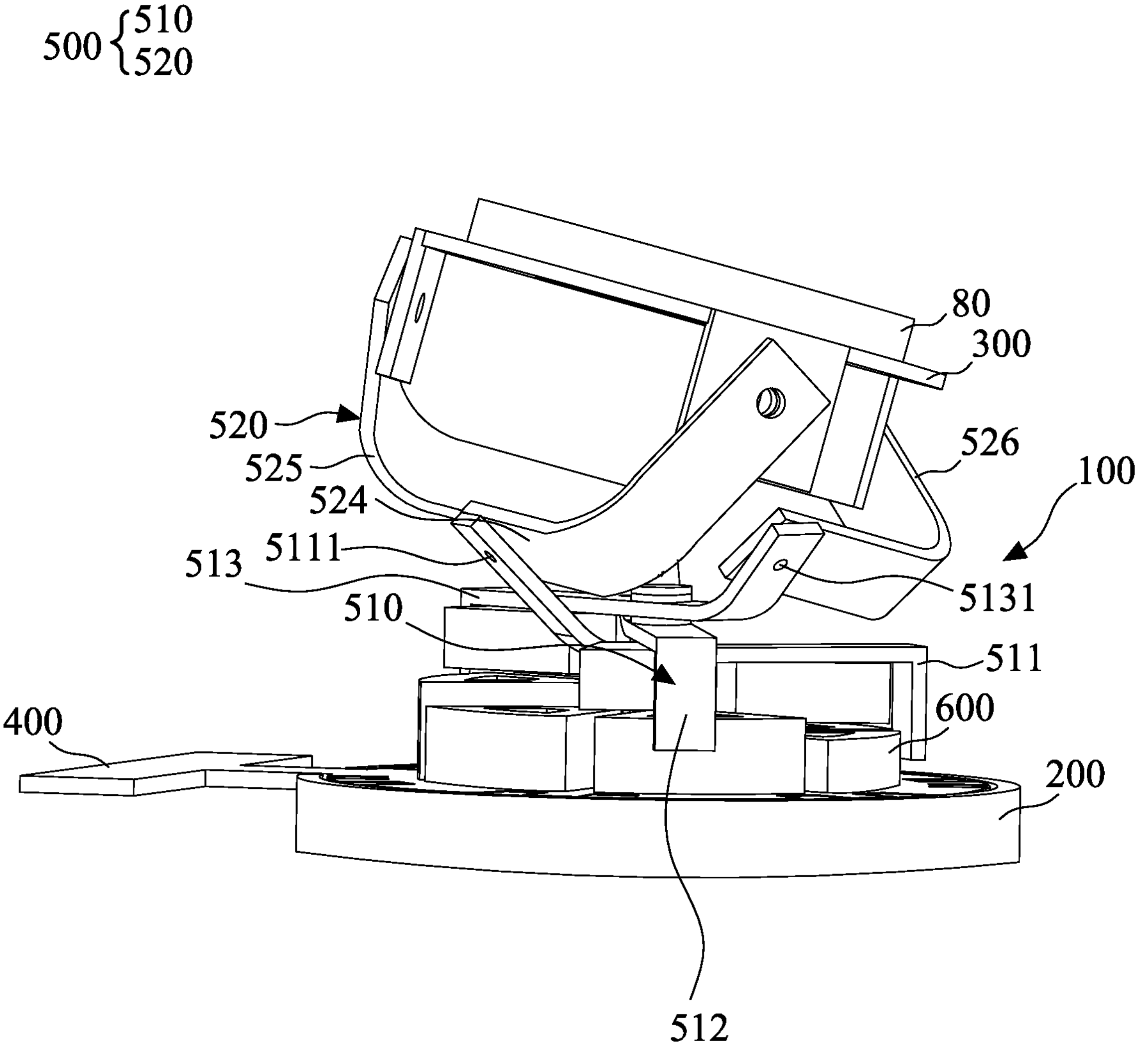
Figure 6C:
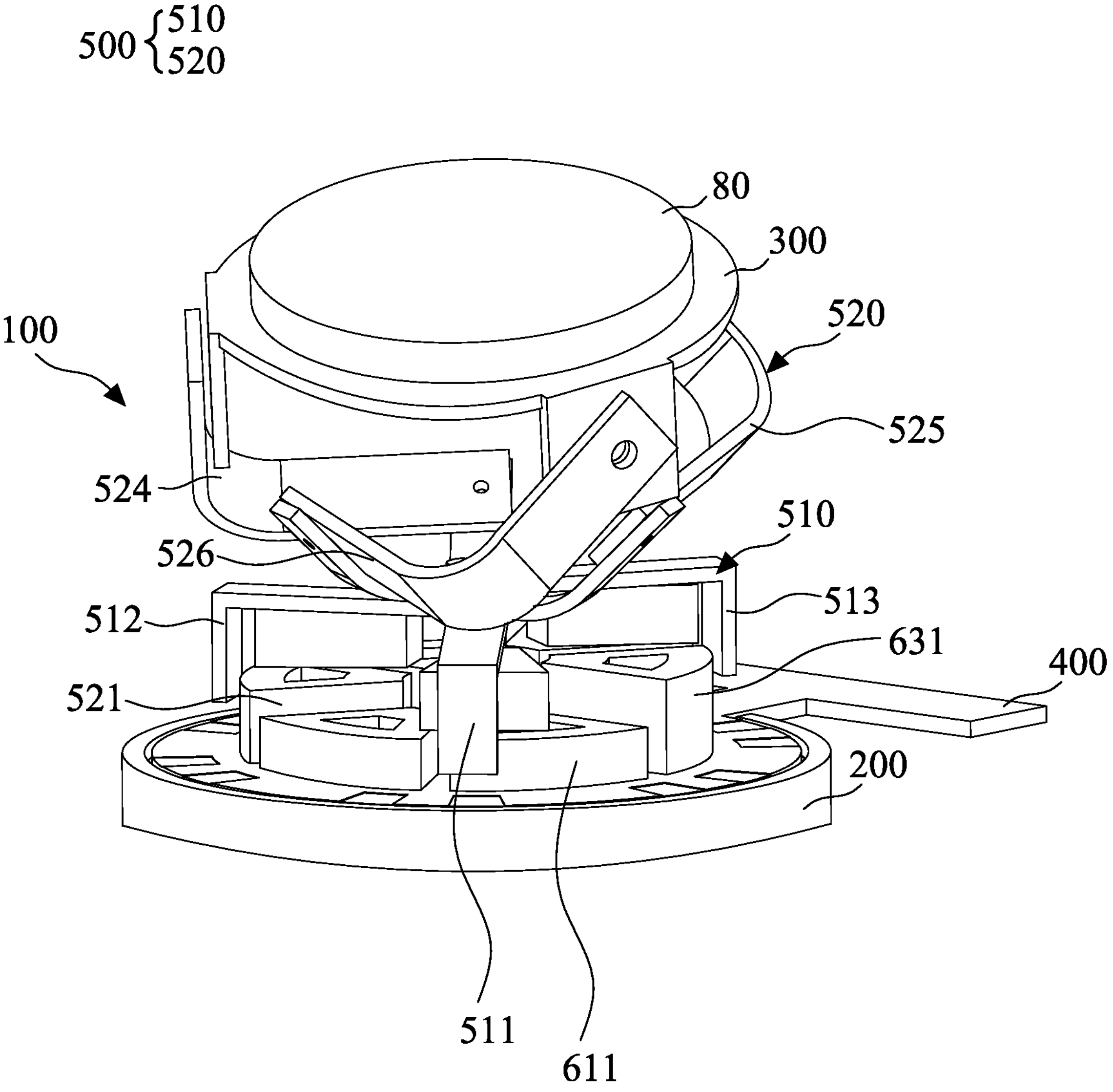
Figure 6D:
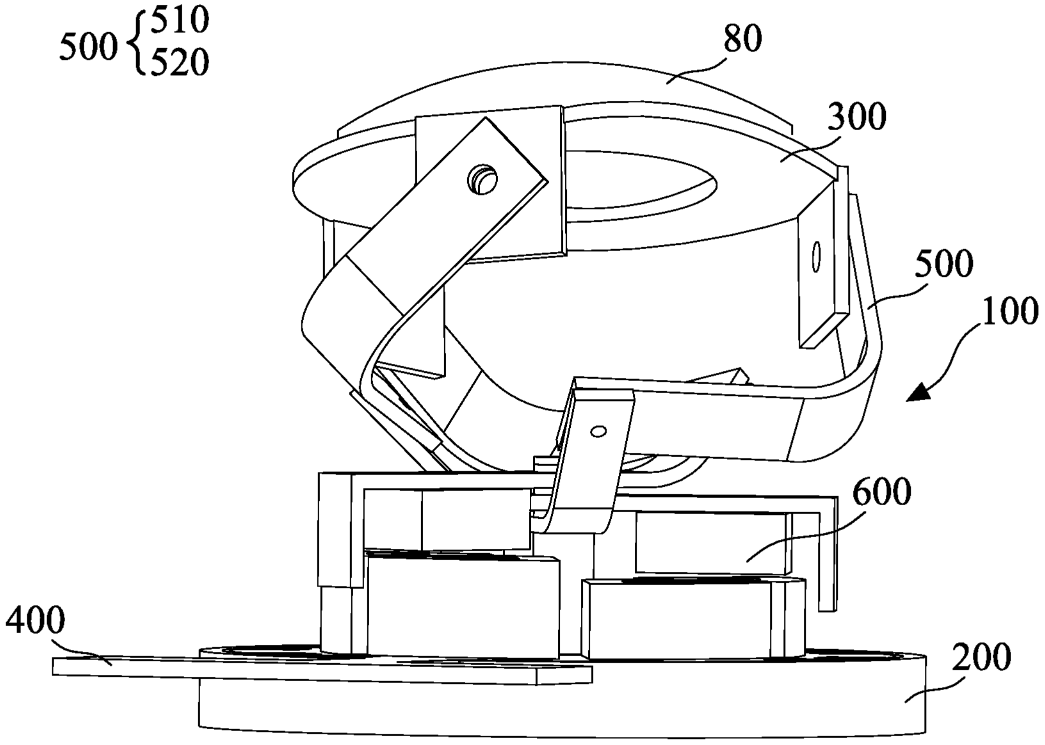

Next, in addition to FIG. 1 to FIG. 3, please refer to FIG. 5A and FIG. 5B to better understand the driving unit 600. FIG. 5A and FIG. 5B are top view and side view of the driving unit 600, in accordance with some embodiments. The driving unit 600 includes a first driving assembly 610, a second driving assembly 620, and a third driving assembly 630. In some embodiments, at least two of the center of the first driving assembly 610, the center of the second driving assembly 620, and the center of the third driving assembly 630 are located at different heights.

The first driving assembly 610 is disposed between the first connecting assembly 510 and the circuit unit 400. In some embodiments, the first driving assembly 610 is disposed below the first connecting element 511. The first driving assembly 610 includes two first coils 611 and a first magnetic element 612. The first magnetic element 612 corresponds to the first coils 611. In detail, the first coils 611 are disposed on the circuit unit 400, and the first magnetic element 612 is disposed below the first flat portion 5114. When viewed along the main axis MA, the first magnetic element 612 is located between the two first coils 611, and the first magnetic element 612 partially overlaps both the two first coils 611. Furthermore, when viewed along the main axis MA, the size of the side of the first magnetic element 612 that is close to the main axis MA is different from the size of the side of the first magnetic element 612 that is away from the main axis MA. As shown in FIG. 5A, the first magnetic element 612 includes a first surface 6121 and a second surface 6122, and the first surface 6121 and the second surface 6122 are parallel with the main axis MA. The first surface 6121 and the second surface 6122 are neither parallel with nor perpendicular to each other.

The second driving assembly 620 is disposed between the first connecting assembly 510 and the circuit unit 400. In some embodiments, the second driving assembly 620 is disposed below the second connecting element 512. The second driving assembly 620 includes two second coils 621 and a second magnetic element 622. The second magnetic element 622 corresponds to the second coils 621. In detail, the second coils 621 are disposed on the circuit unit 400, and the second magnetic element 622 is disposed below the second flat portion 5124. When viewed along the main axis MA, the second magnetic element 622 is located between the two second coils 621, and the second magnetic element 622 partially overlaps both the two second coils 621. Furthermore, when viewed along the main axis MA, the size of the side of the second magnetic element 622 that is close to the main axis MA is different from the size of the side of the second magnetic element 622 that is away from the main axis MA.

The third driving assembly 630 is disposed between the first connecting assembly 510 and the circuit unit 400. In some embodiments, the third driving assembly 630 is disposed below the third connecting element 513. The third driving assembly 630 includes two third coils 631 and a third magnetic element 632. The third magnetic element 632 corresponds to the third coils 631. In detail, the third coils 631 are disposed on the circuit unit 400, and the third magnetic element 632 is disposed below the third flat portion 5134. When viewed along the main axis MA, the third magnetic element 632 is located between the two third coils 631, and the third magnetic element 632 partially overlaps both the two third coils 631. Furthermore, when viewed along the main axis MA, the size of the side of the third magnetic element 632 that is close to the main axis MA is different from the size of the side of the third magnetic element 632 that is away from the main axis MA.

In addition, when viewed along the main axis MA, the first coil 611, the second coil 621, and the third coil 631 may have substantially the same shape, such as a sector-like shape. Moreover, the first magnetic element 612, the second magnetic element 622, and the third magnetic element 632 may also have substantially the same shape, such as a trapezoid.

However, since the first immovable-part connecting-portion 5112, the second immovable-part connecting-portion 5122, and the third immovable-part connecting-portion 5132 are located at different heights, the thickness of one or more of the first coil 611, the second coil 621, the third coil 631, the first magnetic element 612, the second magnetic element 622, and the third magnetic element 632 may be affected accordingly. The thickness of one or more of the first coil 611, the second coil 621, the third coil 631, the first magnetic element 612, the second magnetic element 622, and the third magnetic element 632 may be determined according to actual needs.

In some embodiments, when viewed along a direction that is perpendicular to the main axis MA, the first coil 611, the second coil 621, and the third coil 631 have different thicknesses, and the first magnetic element 612, the second magnetic element 622, and the third magnetic element 632 also have different thicknesses. In some embodiments, when viewed along a direction that is perpendicular to the main axis MA, the first coil 611, the second coil 621, and the third coil 631 have the same thickness, while the first magnetic element 612, the second magnetic element 622, and the third magnetic element 632 have different thicknesses. In some embodiments, when viewed along a direction that is perpendicular to the main axis MA, the first magnetic element 612, the second magnetic element 622, and the third magnetic element 632 have the same thickness, while the first coil 611, the second coil 621, and the third coil 631 have different thicknesses.

That is, in some embodiments, at least two of the maximum size of the first coil 611 in the main axis MA, the maximum size of the second coil 621 in the main axis MA, and the maximum size of the third coil 631 in the main axis MA are different. In addition, in some embodiments, at least two of the maximum size of the first magnetic element 612 in the main axis MA, the maximum size of the second magnetic element 622 in the main axis MA, and the maximum size of the third magnetic element 632 in the main axis MA are different.

In this embodiment, the first driving assembly 610, the second driving assembly 620, and the third driving assembly 630 include two first coils 611, two second coils 621, and two third coils 631, respectively. However, the first driving assembly 610, the second driving assembly 620, and the third driving assembly 630 may only include a single coil.

Next, please refer to FIG. 1 to FIG. 3 again to understand the sensing assembly 700. The sensing assembly 700 includes a first sensing element 710, a second sensing element 720, and a third sensing element 730. The first sensing element 710, the second sensing element 720, and the third sensing element 730 may be Hall sensors, Giant Magneto Resistance (GMR) sensors, Tunneling Magneto Resistance (TMR) sensors, etc.

In some embodiments, the first sensing element 710, the second sensing element 720, and the third sensing element 730 are respectively disposed in the hollows of the first coil 611, the second coil 621, and the third coil 631 on the circuit unit 400. In some embodiments, an additional circuit unit may be provided, and the first sensing element 710, the second sensing element 720, and the third sensing element 730 may be disposed on the additional circuit unit.

Next, please refer to FIG. 1, FIG. 2, and FIG. 6A to FIG. 6D to understand how the movable part 300 moves relative to the immovable part 200. Due to the connecting unit 500 and the driving unit 600, the movable part 300 is movable between an initial position and any tilted position within the movement range. FIG. 6A to FIG. 6D are schematic views showing the movable part 300 in a tilted position from different perspectives, in accordance with some embodiments.

Due the electromagnetic force generated between the first coils 611 and the first magnetic element 612, the first driving assembly 610 may generate a first driving force applied to the first flat portion 5114. Due to the electromagnetic force generated between the second coils 621 and the second magnetic element 622, the second driving assembly 620 may generate a second driving force applied to the second flat portion 5124. Due to the electromagnetic force generated between the third coils 631 and the third magnetic element 632, the third driving assembly 630 may generate a third driving force applied to the third flat portion 5134.

The magnitude and directions of the generated first driving force, the generated second driving force, and the generated third driving force may be controlled according to actual needs. For example, the directions of the first driving force, the second driving force, and the third driving force may depend on the flow direction of the current flowing through the first coils 611, the second coils 621, the third coils 631 and the magnetic-pole arrangement direction of the first magnetic element, the second magnetic element 622, and the third magnetic element 632. In some embodiments, the directions of the first driving force, the second driving force, and the third driving force are not parallel with each other. In some embodiments, the directions of the first driving force, the second driving force, and the third driving force are not parallel with the main axis MA. In some embodiments, the directions of the first driving force, the second driving force, and the third driving force are perpendicular to the main axis MA.

The first driving force may drive the first flat portion 5114 to rotate relative to the immovable part 200 around a first rotation axis. The second driving force may drive the second flat portion 5124 to rotate relative to the immovable part 200 around a second rotation axis. The third driving force may drive the third flat portion 5134 to rotate relative to the immovable part 200 around a third rotation axis. In this embodiment, the fixing rod 230 passes through the first immovable-part connecting-portion 5112, the second immovable-part connecting-portion 5122, and the third immovable-part connecting-portion 5132, so that the first flat portion 5114, the second flat portion 5124, and the third flat portion 5134 have the same rotation axis. However, in some embodiments, the first flat portion 5114, the second flat portion 5124, and the third flat portion 5134 may have different rotation axes. Due to the rotation of the first connecting assembly 510, the second connecting assembly 520 may be driven to move, making the movable part 300 and the connected optical assembly 80 tilt relative to the immovable part 200.

For ease of illustration, the plane where the first intermediate connecting portion 5111, the second intermediate connecting portion 5121, and the third intermediate connecting portion 5131 are located is defined as an intermediate imaginary plane. In addition, the plane where the fourth movable-part connecting-portion 5242, the fifth movable-part connecting-portion 5252, and the sixth movable-part connecting-portion 5262 are located is defined as a movable part imaginary plane.

When the movable part 300 is in the initial position (as shown in FIG. 1 and FIG. 2), the intermediate imaginary plane is perpendicular to the main axis MA, and the movable part imaginary plane is also perpendicular to the main axis MA. The normal direction of the top surface of the movable part 300 is parallel with the main axis MA. When the movable part 300 is in a tilted position (that is, when the movable part 300 is tilted, as shown in FIG. 6A to FIG. 6D), the movable part imaginary plane is perpendicular to a tilt axis, and the tilt axis is not parallel with the main axis MA. There is an angle between the normal direction of the top surface of the movable part 300 and the main axis MA.

When the movable part 300 is in any position within the movement range, since the first connecting element 511, the second connecting element 512, and the third connecting element 513 rotate with the fixed rod 230 as the rotation axis, and there is a height difference between the first coil 611, the second coil 621, and the third coil 631, the degree of freedom of the movable part 300 is restricted. Therefore, the intermediate imaginary plane is always perpendicular to the main axis MA. That is, the first connecting element 511, the second connecting element 512, and the third connecting element 513 may rotate on the same plane.

Since the connecting unit 500 and the driving unit 600 restrict the degree of freedom of the movable part 300, the limits of the movement of the movable part 300 relative to the immovable part 200 include three limit positions, which are respectively defined as a first limit position, a second limit position, and a third limit position. In some embodiments, by changing the angle or lengths of the first bent portion 5113, the second bent portion 5123, the third bent portion 5133, the fourth bent portion 5243, the fifth bent portion 5253, and the sixth bent portion, the limit positions where the movable part 300 moves to the limit relative to the immovable part 200 may be changed. It should be noted that, although FIG. 6A to FIG. 6D are schematic views showing the movable part 300 in a certain tilted position, a person skilled in the art should be able to infer how the movable part 300 may be in any position within the movement range because different perspectives are shown.

When the movable part 300 is tilted, the sensing assembly 700 may sense the movement and/or the position of the movable part 300. The first sensing element 710 may sense changes in magnetic field lines (including but not limited to magnetic field density and magnetic field direction) of the first magnetic element 612 disposed below the first connecting element 511 to obtain the movement and/or the position of the first connecting element 511, and the first sensing element 710 may output a first sensing signal regarding the first connecting element 511. The second sensing element 720 may sense changes in magnetic field lines (including but not limited to magnetic field density and magnetic field direction) of the second magnetic element 622 disposed below the second connecting element 512 to obtain the movement and/or the position of the second connecting element 512, and the second sensing element 720 may output a second sensing signal regarding the second connecting element 512. The third sensing element 730 may sense changes in magnetic field lines (including but not limited to magnetic field density and magnetic field direction) of the third magnetic element 632 disposed below the third connecting element 513 to obtain the movement and/or the position of the third connecting element 513, and the third sensing element 730 may output a third sensing signal regarding the third connecting element 513.

In some embodiments, the optical module 100 further includes a database. The database may record the movement of the movable part 300 relative to the immovable part 200. The database may include reference information, first limit information, second limit information, and third limit information. The reference information records the first sensing signal, the second sensing signal, and the third sensing signal under the circumstance that the movable part 300 is in the initial position. The first limit information records the first sensing signal, the second sensing signal, and the third sensing signal under the circumstance that the movable part 300 is in the first limit position relative to the immovable part 200. The second limit information records the first sensing signal, the second sensing signal, and the third sensing signal under the circumstance that the movable part 300 is in the second limit position relative to the immovable part 200. The third limit information records the first sensing signal, the second sensing signal, and the third sensing signal under the circumstance that the movable part 300 is in the third limit position relative to the immovable part 200.

For example, when the movable part 300 is in the initial position, the top surface of the movable part 300 is substantially perpendicular to the main axis MA, and the first sensing signal, the second sensing signal, and the third sensing signal may be recorded in a relative manner that the sensed angles are recorded as 0 degrees, 0 degrees, and 0 degrees. However, the first sensing signal, the second sensing signal, and the third sensing signal may also be recorded in an actual manner that the sensed angles are recorded by their absolute angles.

When the movable part 300 is in the first limit position, the first sensing signal, the second sensing signal, and the third sensing signal may be recorded in a relative manner that the sensed angles are recorded as 0 degrees, +X degrees, and −X degrees. When the movable part 300 is in the second limit position, the first sensing signal, the second sensing signal, and the third sensing signal may be recorded in a relative manner that the sensed angles are recorded as −X degrees, 0 degrees, and +X degrees. When the movable part 300 is in the third limit position, the first sensing signal, the second sensing signal, and the third sensing signal may be recorded in a relative manner that the sensed angles are recorded as +X degrees, −X degrees, and 0 degrees. In this paragraph, ±X degrees represent the relative angle where the movable part 300 moves to the limit relative to the immovable part 200.

Before the optical module 100 is operated, a calibration procedure may be performed by the driving unit 600 based on the database to make sure that the movable part 300 moves normally. The calibration procedure includes making the movable part 300 move to the initial position, the first limit position, the second limit position, and the third limit position and confirming whether the sensed first sensing signal, the sensed second sensing signal, and the sensed third sensing signal are consistent with those stored in the database.

In addition, the optical module 100 may have other applications. For example, eye-tracking technology has developed rapidly in recent years. Advertisers may decide the content of advertisements based on how long consumers look at advertisements. Users of electronic devices may control electronic devices through eye movements. Eye tracking technology usually illuminates the eyeball or a specific area via multiple emitting elements (for example, light sources) to generate a pattern for identifying the position of the eyeball, and requires reflective elements to reflect the pattern on the eyeball or a specific area. The optical module 100 may be connected to the reflective elements, changing the positions of the movable part 300 and the connected reflective elements according to the moving eyeball. That is, in addition to the electronic devices described above, the optical module 100 may be used for head-mounted display (HMD), especially head-mounted display using virtual reality (VR) technology, augmented reality (AR) technology, and the like.

Some embodiments of the present disclosure provide an optical module. The optical module includes an immovable part, a movable part, a connecting unit, and a driving unit. The connecting unit includes a first connecting assembly and a second connecting assembly that are connected to each other. Since the first connecting assembly and the second connecting assembly are arranged along the main axis, the overall size of the optical module in the directions perpendicular to the main axis may be reduced, and the volume in at least two dimensions among three dimensions may be reduced. Therefore, miniaturization of the optical module may be achieved. The driving unit may apply a driving force to the first connecting assembly to drive the first connecting assembly to rotated, making the second connecting assembly move, so the movable part and the connected optical assembly are tilted relative to the immovable part. Furthermore, the connecting unit and the driving unit may restrict the degree of freedom of the movable part, so the movable part may move stably. In addition, the optical module may include a sensing assembly, and a suitable database may be created to perform a calibration procedure.

The foregoing outlines features of several embodiments, so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure. In addition, the scope of the present disclosure is not limited to the specific embodiments, and the combination of various claims and embodiments is within the scope of the present disclosure.

What is claimed is:

1. An optical module, comprising:

an immovable part;

a movable part movable relative to the immovable part within a movement range, wherein the movable part is connected to an optical assembly;

a connecting unit, wherein the movable part is movably connected to the immovable part via the connecting unit, and wherein the connecting unit comprises a first connecting assembly connected to the immovable part, the first connecting assembly comprising a first connecting element, a second connecting element, and a third connecting element;

a driving unit driving the first connecting assembly to rotate; and a sensing assembly comprising:

a first sensing element sensing the movement of the first connecting element and outputting a first sensing signal regarding the first connecting element;

a second sensing element sensing the movement of the second connecting element and outputting a second sensing signal regarding the second connecting element; and a third sensing element sensing the movement of the third connecting element and outputting a third sensing signal regarding the third connecting element.

2. An optical module comprising:

an immovable part;

a movable part movable relative to the immovable part within a movement range, wherein the movable part is connected to an optical assembly; and a connecting unit, wherein the movable part is movably connected to the immovable part via the connecting unit, the connecting unit comprising:

a first connecting assembly; and a second connecting assembly movably connected to the first connecting assembly, wherein an arrangement direction along which a center of the first connecting assembly and a center of the second connecting element are arranged is parallel with a main axis, wherein when viewed along the main axis, at least one of the first connecting assembly and the second connecting assembly at least partially overlaps the optical assembly, and wherein the first connecting assembly comprises:

a first connecting element comprising:

a first intermediate connecting portion movably connected to the second connecting assembly;

a first immovable-part connecting-portion connected to the immovable part;

a first bent portion having a bent structure and located between the first intermediate connecting portion and the first immovable-part connecting-portion; and a first flat portion having a flat structure and connected to the first bent portion;

a second connecting element comprising:

a second intermediate connecting portion movably connected to the second connecting assembly;

a second immovable-part connecting-portion connected to the immovable part;

a second bent portion having a bent structure and located between the second intermediate connecting portion and the second immovable-part connecting-portion; and a second flat portion having a flat structure and connected to the second bent portion;

a third connecting element comprising:

a third intermediate connecting portion movably connected to the second connecting assembly;

a third immovable-part connecting-portion connected to the immovable part;

a third bent portion having a bent structure and located between the third intermediate connecting portion and the third immovable-part connecting-portion; and a third flat portion having a flat structure and connected to the third bent portion.

3. The optical module as claimed in claim 2, wherein the first immovable-part connecting-portion is located between the first bent portion and the first flat portion, the second immovable-part connecting-portion is located between the second bent portion and the second flat portion, the third immovable-part connecting-portion is located between the third bent portion and the third flat portion, the first flat portion is rotatable relative to the immovable part around a first axis, the second flat portion is rotatable relative to the immovable part around a second axis, and the third flat portion is rotatable relative to the immovable part around a third axis.

4. The optical module as claimed in claim 2, wherein the second connecting assembly comprises:

a fourth connecting element comprising:

a fourth intermediate connecting portion movably connected to the first connecting assembly;

a fourth movable-part connecting-portion connected to the movable part; and a fourth bent portion having a bent structure and located between the fourth intermediate connecting portion and the fourth movable-part connecting-portion;

a fifth connecting element comprising:

a fifth intermediate connecting portion movably connected to the first connecting assembly;

a fifth movable-part connecting-portion connected to the movable part; and a fifth bent portion having a bent structure and located between the fifth intermediate connecting portion and the fifth movable-part connecting-portion;

a sixth connecting element comprising:

a sixth intermediate connecting portion movably connected to the first connecting assembly;

a sixth movable-part connecting-portion connected to the movable part; and a sixth bent portion having a bent structure and located between the sixth intermediate connecting portion and the sixth movable-part connecting-portion.

5. The optical module as claimed in claim 4, wherein a plane where the first intermediate connecting portion, the second intermediate connecting portion, and the third intermediate connecting portion are located is an intermediate imaginary plane, a plane where the fourth movable-part connecting-portion, the fifth movable-part connecting-portion, and the sixth movable-part connecting-portion are located is a movable part imaginary plane, wherein when the movable part is in an initial position, the intermediate imaginary plane is perpendicular to the main axis, and the movable part imaginary plane is also perpendicular to the main axis, wherein when the movable part is in a tilted position, the movable part imaginary plane is perpendicular to a tilt axis that is not parallel with the main axis, wherein when the movable part is in any position within the movement range, the intermediate imaginary plane is perpendicular to the main axis.

6. The optical module as claimed in claim 2, further comprising a driving unit, wherein the driving unit comprises:

a first driving assembly generating a first driving force applied to the first flat portion, comprising:

a first coil; and a first magnetic element corresponding to the first coil;

a second driving assembly generating a second driving force applied to the second flat portion, comprising:

a second coil; and a second magnetic element corresponding to the second coil;

a third driving assembly generating a third driving force applied to the third flat portion, comprising:

a third coil; and a third magnetic element corresponding to the third coil;

wherein at least two of a center of the first driving assembly, a center of the second driving assembly, and a center of the third driving assembly are located at different heights;

wherein a direction of the first driving force, a direction of the second driving force, and a direction of the third driving force are not parallel with each other;

wherein the direction of the first driving force, the direction of the second driving force, and the direction of the third driving force are not parallel with the main axis.

7. The optical module as claimed in claim 6, wherein the direction of the first driving force, the direction of the second driving force, and the direction of the third driving force are perpendicular to the main axis, wherein the first magnetic element comprises a first surface and a second surface, the first surface and the second surface are both parallel with the main axis, and the first surface and the second surface are neither parallel with nor perpendicular to each other, wherein at least two of a maximum size of the first coil measured along the main axis, a maximum size of the second coil measured along the main axis, and a maximum size of the third coil measured along the main axis are different.

8. The optical module as claimed in claim 1, further comprising a database, wherein the database records the movement of the movable part relative to the immovable part, and the database comprises:

reference information recording the first sensing signal, the second sensing signal, and the third sensing signal under the circumstance that the movable part is in an initial position;

first limit information recording the first sensing signal, the second sensing signal, and the third sensing signal under the circumstance that the movable part is in a first limit position relative to the immovable part;

second limit information recording the first sensing signal, the second sensing signal, and the third sensing signal under the circumstance that the movable part is in a second limit position relative to the immovable part; and third limit information recording the first sensing signal, the second sensing signal, and the third sensing signal under the circumstance that the movable part is in a third limit position relative to the immovable part;

wherein a calibration procedure is performed by the driving unit based on the database to make sure that the movable part moves normally, the calibration procedure comprises making the movable part move to the initial position, the first limit position, the second limit position, and the third limit position and confirming whether the sensed first sensing signal, the sensed second sensing signal, and the sensed third sensing signal are consistent with those stored in the database.

9. The optical module as claimed in claim 1, wherein the immovable part comprises:

a base;

a bottom plate disposed on the base, wherein the bottom plate comprises a central rod; and a fixing rod surrounding the central rod.

10. The optical module as claimed in claim 9, wherein the fixing rod has a plurality of recessed portions.

11. The optical module as claimed in claim 9, wherein the central rod and the fixing rod extend along the same direction.

12. The optical module as claimed in claim 1, wherein the movable part comprises:

a movable part body; and a plurality of movable part bent portions bent downwardly relative to the movable part body.

13. The optical module as claimed in claim 12, wherein the plurality of movable part bent portions are spaced apart from each other by the same angle.

14. The optical module as claimed in claim 13, wherein an angle between adjacent two of the plurality of movable part bent portions is approximately 120 degrees.

15. An optical module comprising:

an immovable part;

a movable part movable relative to the immovable part within a movement range, wherein the movable part is connected to an optical assembly;

a connecting unit, wherein the movable part is movably connected to the immovable part via the connecting unit; and a driving unit comprising a first coil, a second coil, and a third coil, wherein the first coil, the second coil, and the third coil are located over the immovable part, and the first coil, the second coil, and the third coil all have different thicknesses.

16. The optical module as claimed in claim 15, wherein the first coil, the second coil, and the third coil are sector-like.

17. The optical module as claimed in claim 15, wherein the driving unit further comprises a first magnetic element located above the first coil, a second magnetic element located above the second coil, and a third magnetic element located above the third coil.

18. The optical module as claimed in claim 17, wherein the connecting unit comprises a first connecting element located above the first magnetic element, a second connecting element located above the second magnetic element, and a third connecting element located above the third magnetic element.

19. The optical module as claimed in claim 1, wherein the driving unit comprises a first coil, a second coil, and a third coil, and the first sensing element, the second sensing element, and the third sensing element are respectively disposed in interior regions of the first coil, the second coil, and the third coil.

20. The optical module as claimed in claim 1, wherein the connecting unit further comprises a second connecting assembly connected to the movable part and the first connecting assembly.

* * * * *